Patented June 9, 1936

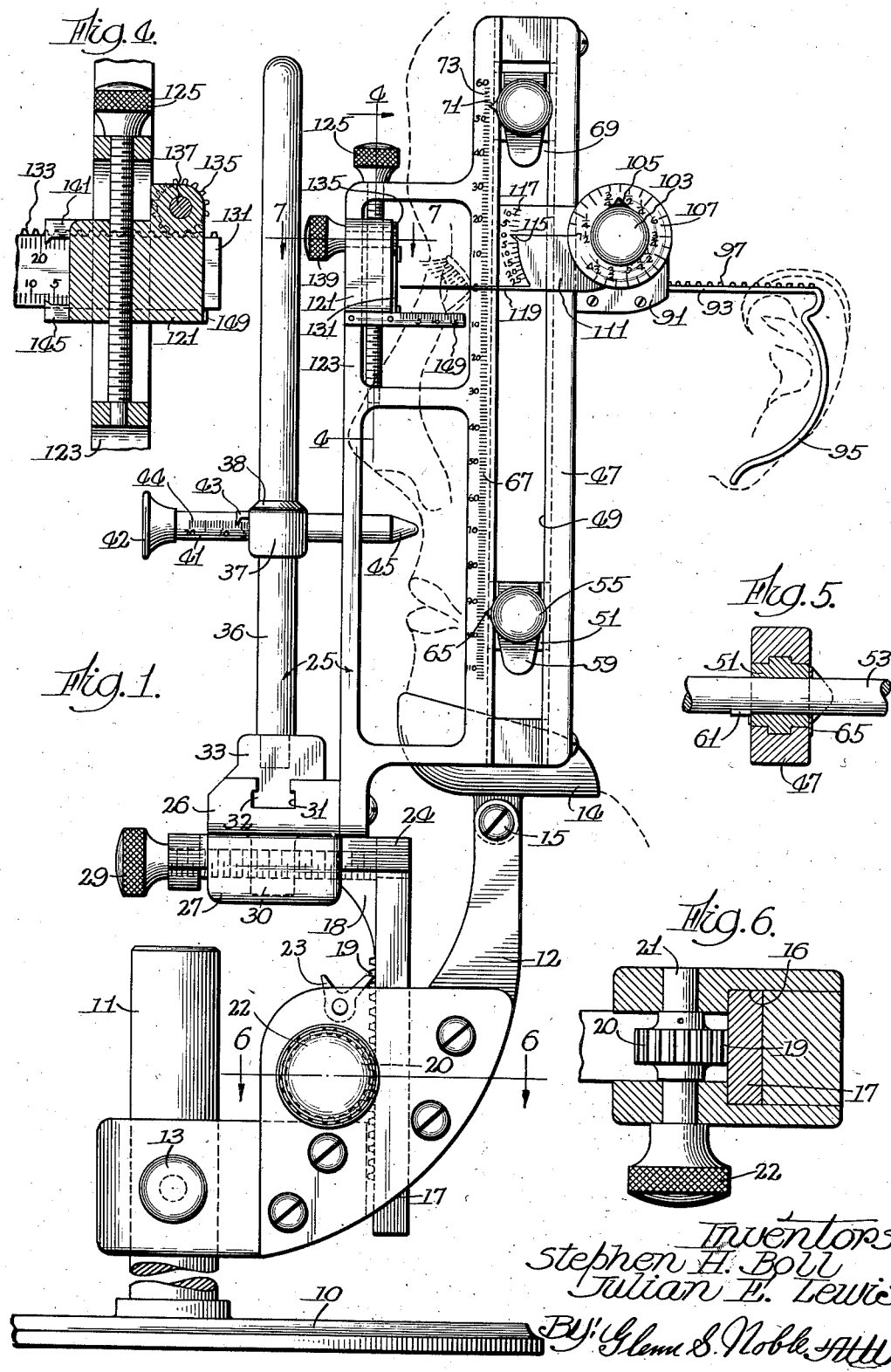

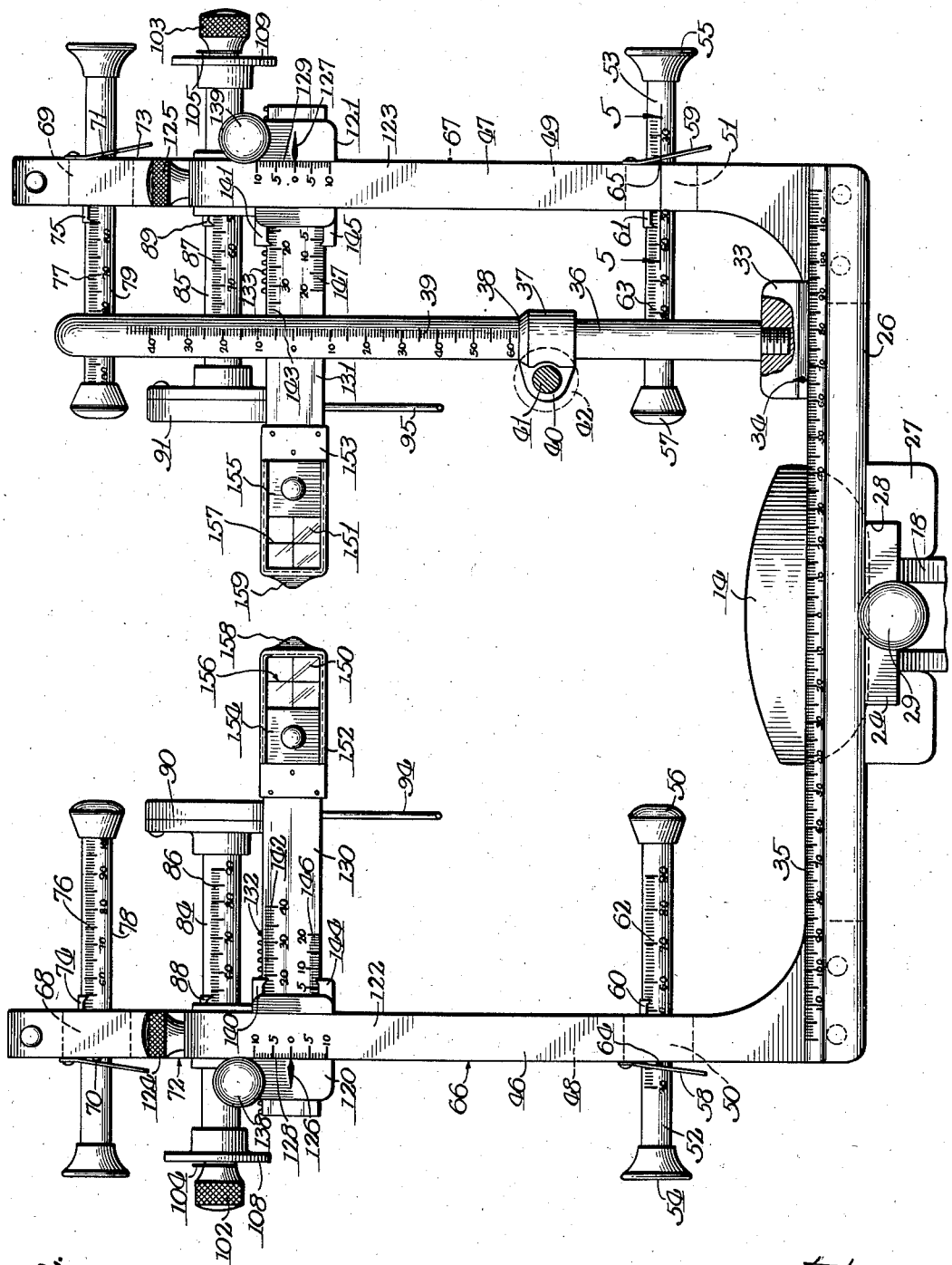

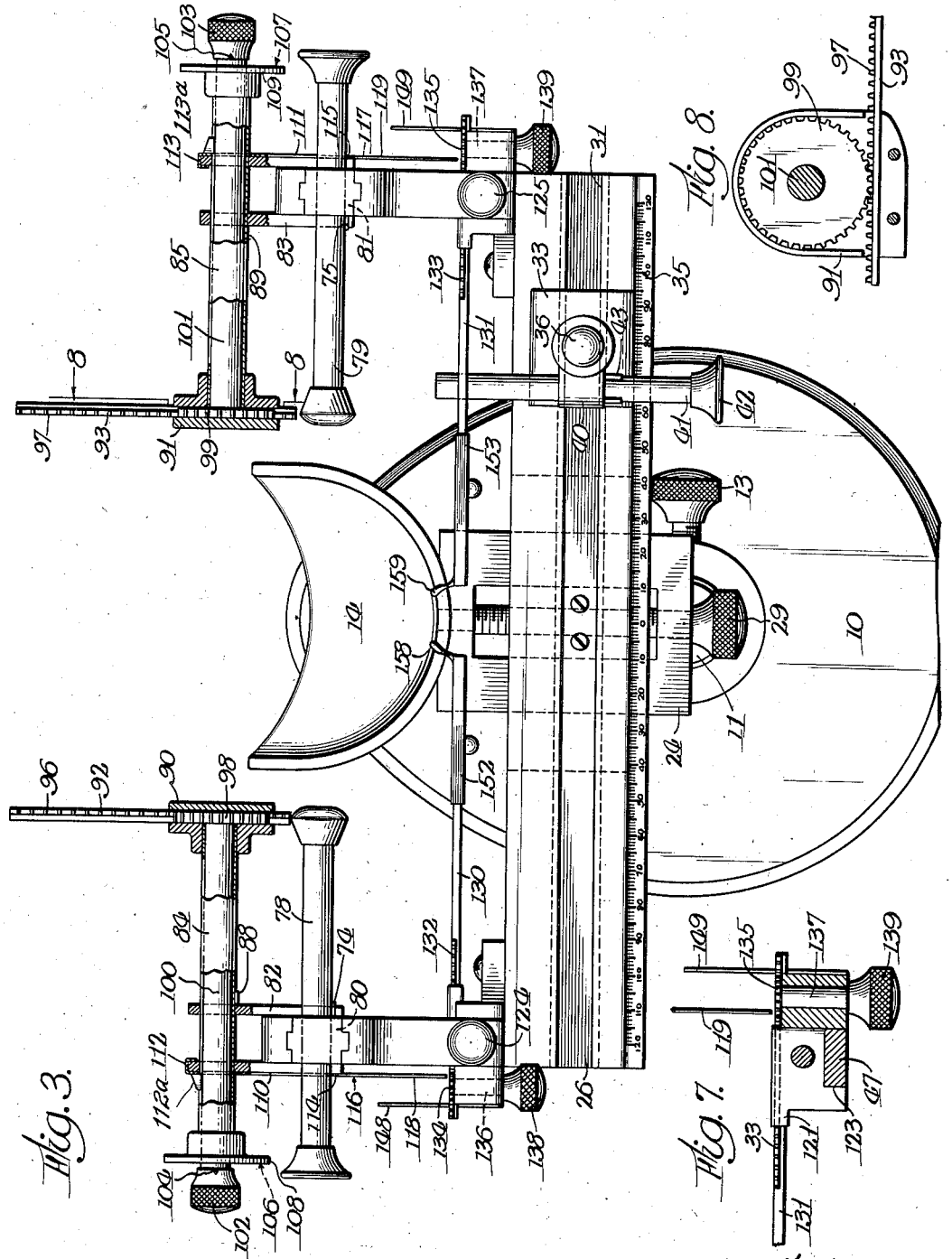

2,043,230

UNITED STATES PATENT OFFICE 2,043,230

FACIAL MEASURING APPARATUS

Stephen H. Boll and Julian E. Lewis, Chicago, Ill.

Application May 19, 1932, Serial No. 612,286

13 Claims. (Cl. 33—174)

This invention relates to a measuring instrument or device for making various measurements with respect to the eyes and face of a person and particularly intended for use for optical purposes such as the manufacture and fitting of glasses or spectacles. This machine provides means for making various measurements such as the distance between the pupils of the eyes and the position of one eye vertically with respect to the other and also provides means for measuring the width of the nose, the distance between the cheek bone, and the projection of the forehead over the eye, the protrusion of the cheek bone and forehead from the eyeball, the horizontal distance between the high points of the cheek bone, the width of the cheek bone, and the width of the jaw bone to determine the facial angle, the length of the temple, and other measurements necessary or desirable for the purposes indicated.

The objects of this invention are to provide an improved instrument or measuring device of the character set forth; to provide a measuring instrument for measuring the distance between the pupils of the eyes and the relative positions thereof in the face as accurately as possible; to provide an instrument for use in connection with the manufacture and fitting of eye glasses or the like, whereby the glasses will be more properly formed and adjusted; to provide means for properly locating the focal points on eye glasses of the ordinary or bifocal types; to provide means for rigidly supporting the head or face of a person and making measurements in connection therewith; and to provide such other improvements in construction and advantages in operation as will appear more fully from the following description.

In the accompanying drawings illustrating this invention;

Figure 1 is a side view showing a face in position therein for determining the different measurements;

Figure 2 is a front view with parts broken away for convenience in illustration;

Figure 3 is a plan view with parts broken away or shown in section;

Figure 4 is an enlarged sectional detail taken on the line 4—4 of Figure 1;

Figure 5 is a detail taken on the line 5—5 of Figure 2;

Figure 6 is a detail taken on the line 6—6 of Figure 1;

Figure 7 is a detail sectional view taken on the line 7—7 of Figure 1; and

Figure 8 is a sectional view taken on the line 8—8 of Figure 3.

The particular embodiment of our invention as shown in these drawings is provided with a support which may be in the form of a bracket or attachment to a table or the like, but which is shown as comprising a base 10 which is adapted to rest on a table and which has an upwardly projecting post 11. A sub-frame or bracket 12 is slidably mounted on the post 11 and is held in adjusted position by a set screw 13. The sub-frame 12 carries a chin rest 14 upon which the person's chin is placed, as shown in Figure 1. This rest is pivotally mounted so that it may be rocked on the sub-frame and is held in fixed position by a set screw 15. The adjustment on the post 11 provides for raising or lowering the chin rest to a suitable or comfortable position.

The sub-frame 12 has a vertical guideway 16 for receiving the vertical leg 17 of an angle shaped bracket 18 and which is adapted to be adjusted vertically in said guideway. For this purpose the leg or bar 17 is provided with a rack 19 which is engaged by a pinion 20 on the shaft 21 which is rotatably mounted in a bearing on the side of the sub-frame 12. The shaft 21 has a knob 22 for turning the same. The bracket 18 is held in adjusted position by means of a dog 23 also mounted on the sub-frame 12.

The bracket 18 has a horizontal portion or table 24 which supports the entire frame 25 or upper portion of the apparatus which carries the measuring devices. This frame has a horizontal bar 26 having downwardly extending projections 27 providing a guideway 28 for receiving the table 24. The bar 26 is slid along the plate or table 24 and accurately adjusted thereon by means of an adjusting screw 29 which is mounted in the bracket 18 and which engages with a threaded projection 30 on the bar 26, as shown in Figure 1.

The bar 26 has a longitudinal guideway 31 for receiving an engaging portion 32 of a block 33 which is slidably mounted thereon. The block 33 has a pointer 34 which cooperates with a scale or calibrations 35 on the bar 26, for making certain horizontal measurements which will presently be described. The block 33 carries a post 36 which extends upwardly to approximately the upper portion of the forehead or head, as shown in Figure 1. A collar 37 is slidably mounted on the post 36 and its upper end is beveled to provide an edge or pointer 38 which coacts with a scale 39 on the post, as shown in Figure 2. The collar 37 has a bearing 40 for receiving a horizontal rod 41 which is slidably mounted therein and which may be moved by means of a handle 42 as shown particularly in Figure 1. The collar 37 is provided with pointers 43 which cooperate with calibrations or scales 44 on the rod 41. The rod is pointed at its inner end as shown at 45, for contact or adjustment against the face. It will be seen that this rod may be moved up and down and laterally over the entire range of the front of the face, permitting the operator to take certain facial measurements at any point from the chin to the forehead.

The main frame or body portion of the instrument has upwardly projecting end frame members 46 and 47 which are secured to the ends of the bar 26 as shown, or which may be formed integrally therewith, if desired. These end frame members have guideways 48 and 49 respectively for receiving cross heads or blocks 50 and 51 which are slidably mounted therein and which are adapted to be held by friction in adjusted positions. These cross heads provide bearings for horizontally adjustable rods 52 and 53 having handles 54 and 55 at their outer ends and provided with knobs 56 and 57 at their inner ends for engagement with the face. These rods are held in position respectively by tension springs 58 and 59 secured to the cross heads 50 and 51. These cross heads have pointers 60 and 61 respectively to coact with calibrations or scales 62 and 63 on the rods, as shown particularly in Figure 2. These adjustable rods with the scales thereon provide means to enable the operator to determine the width of the face at a point back of the chin and in line with the lower jaw or approximately the cheek portion of the face. The cross heads 50 and 51 are also provided with pointers 64 and 65 which coact with calibrations or scales 66 and 67 on the side frames as shown in Figure 1, whereby certain vertical dimensions or measurements of the face may be determined by means of the calibrated rods 52 and 53.

Another set of cross heads or slides 68 and 69 are mounted in the guideways 48 and 49 at the top of the frame members. These blocks are provided with points 70 and 71 which coact with scales 72 and 73 on the side frame pieces 46 and 47. These blocks are also provided with pointers 74 and 75 which coact with scales 76 and 77 on horizontally movable rods 78 and 79 which are similar to the rods 52 and 53 and which are adapted for making measurements of the upper portion of a head. Furthermore, these rods may be adjusted so that the enlarged inner ends will act as supports for steadying the head in the frame. These bars are calibrated particularly for the purpose of permitting the operator to determine the width between the temples of the person to be fitted.

The third set of cross heads or slidable blocks 80 and 81 are mounted in the slideways of the respective end frame members 46 and 47, these blocks being provided with rearwardly extending bearings 82 and 83 as shown in Figure 3. Tubes 84 and 85 are slidably mounted in the respective sets of bearings and are provided respectively with scales or calibrations 86 and 87 which coact with figures or pointers 88 and 89 on the bearings for making lateral measurements and particularly for measuring the width of the face at the top of the cheek bones. The inner ends of the tubes 84 and 85 carry bearings or guides 90 and 91 which serve to make contact with the sides of the face and which also support temples or bows 92 and 93 which are slidably mounted therein and which have hooked ends 94 and 95 which are adapted to fit against the backs of the ears as indicated in Figure 1. These bows have racks 96 and 97 which are engaged respectively by gears or pinions 98 and 99 on the ends of shafts 100 and 101 rotatably mounted in the tubes 84 and 85. These shafts are turned by knobs 102 and 103 having pointers 104 and 105 which coact or register with circumferential calibrations or scales 106 and 107 on discs 108 and 109 on the ends of the tubes 84 and 85. By means of this arrangement the bows may be adjusted in all directions to fit the ears and the corresponding measurements or indications provided for properly fitting the bows of spectacles for the wearer. It will of course be apparent that by turning the respective knobs 102 and 103, the bows will be moved longitudinally through the rack and pinion mechanism and such movement will be registered or indicated by the scales 106 and 107.

Thin metal plates 110 and 111 are also pivotally supported on the tubes 84 and 85 adjacent to the bearings 82, these plates having hooked ends 112 and 113 for engagement with the bearings to prevent them from moving longitudinally with the tubes and also have keys or projections 112a and 113a which engage with slots in said tubes. These plates have fingers or pointers 114 and 115 which are adapted to register with circumferential scales or calibrations 116 and 117 on the sides of the bearings, as shown in Figure 1. These plates also have relatively long fingers or pointers 118 and 119 which are normally approximately in alignment with the horizontal portions of the bows and which project forwardly to points approximately beyond the nose, these pointers serving to make further measurements or determination of the relative position of the pupils of the eyes with respect to the nose and adjacent portions of the face, and serve to position the side plates to show the angles of the bows or temples.

In addition to the above described instrumentalities, the side frame members also carry the measuring devices for determining the relative positions of the eyes with respect to each other and with respect to the various features of the face or head. Two slides or blocks 120 and 121 are slidably mounted on the front vertical pieces 122 and 123 of the side frame members and are adjusted and carried by screws 124 and 125 fixed in the side frame members as shown in Figures 1 and 4. The slides or blocks 120 and 121 are provided with points or indexes 126 and 127 which are adapted to coact or register with scales 128 and 129 on the vertical frame pieces 122 and 123, as shown in Figure 2. The blocks 120 and 121 provide bearings for slidable bars 130 and 131 which are provided respectively with racks 132 and 133, these racks being engaged by pinions 134 and 135 on the ends of stub shafts 136 and 137 mounted in the blocks 120 and 121. These stub shafts have knobs 138 and 139 for turning them. The upper portions of the blocks 120 and 121 have points or indexes 140 and 141 which register with scales 142 and 143 on the bars 130 and 131 for making certain measurements and they are also provided on their lower edges with points 144 and 145 which register with scales 146 and 147 for making other measurements as will be seen from Figure 2.

The blocks 120 and 121 also carry horizontally arranged calibrated fingers or bars 148 and 149 which project rearwardly as shown in Figures 1 and 3, the use of which will also be presently explained.

The bars 130 and 131 carry means, such as cross hairs for accurately positioning the same with respect to the pupils of the eyes, such cross hairs being arranged horizontally and vertically or at right angles to each other as more or less commonly found in optical instruments. Such vertical and horizontal lines are conveniently provided by being marked on glass or transparent windows 150 and 151 carried in frames 152 and 153 on the adjacent ends of the bars, as shown in Figure 2. These frames are provided with shutters 154 and 155 having handles whereby they may be slid longitudinally to cover the cross hairs 156 and 157 when desired. The frames 152 and 153 also have inwardly extending pads or projections 158 and 159 for engagement with the sides of the nose for measuring the width of the same.

In view of the drawings taken in connection with the above description it is thought that the operation or use of our improved instrument will be readily apparent to those familiar with this art. However, as indicating in general the use of the same it may be assumed that the face of a person for whom glasses are to be fitted is properly positioned with the chin on the rest 14 which may be adjusted to comfortably fit the same. The rods 78 and 79 may then be adjusted to bring their inner engaging terminals against the head which serves to steady the same, these rods being held by the friction springs. At the same time, the scales 76 and 77 may be read to determine the width of the head above the temples or between the temples. The rods 52 and 53 may be adjusted in a similar manner and by means of the scales thereon the width of the cheek bone and jaw bone may be measured in order to determine the facial angle. It will of course be noted that these rods may be adjusted vertically to properly position the same and such vertical measurements may be read upon the scales on the sides of the frame as heretofore described.

The post 36 may be moved laterally and the rod 41 carried thereby may be moved vertically as well as longitudinally and the scales on such post and rod furnish means for making various measurements either vertically or horizontally over the entire range of the front of the face at any point from the chin to the forehead, such for instance, as the height of the cheek bones, height of the forehead over the eye; the protrusion of the cheek bone and forehead from the eyeball; the vertical measurement from the bottom of the chin to the top of the forehead and from the top to bottom of orbital bones of the eye socket. Such measurements enable the operator to determine with accuracy what the vertical width of the lens should be to fit the patient and also if such lens is of the rimless type, the position at which holes for assembling mountings are to be drilled. If such lenses are to be of the bevel or frame type, such measurements enable the operator to determine whether or not lenses should be decentered vertically and if so to what extent.

The calibrated tubes 84 and 85 with the parts carried thereby are then adjusted so that their end pieces 90 and 91 engage with the face at the top of the cheek bones and the calibrations thereon serve to measure the width of the face at this point, these parts also serving to further support the head of the patient during other measurements, as for instance, in taking the pupilary distance. The nose or temples may then be adjusted against the ears and the graduated dials serve to indicate the length of temple for each ear, and also the proper angles for the same.

The plates 110 and 111 with pointers thereon may be swung or adjusted to further determine the position of the pupils with respect to the other features of the head and the scales 148 and 149 may be utilized for measuring the horizontal position of the pupils with respect to the bridge of the nose or for such other measurements as may be desired in this connection.

The measurement of the pupilary distance, which is one of the most important features, is accomplished by moving the bars 130 and 131 longitudinally by means of the rack and pinion devices until the vertical hairs or marks coincide with the centers of the pupils. These bars may then be adjusted vertically by the adjusting screws 124 and 125 to bring the horizontal hairs or marks in alignment with the centers of the pupils or in other words, these devices are adjusted so that the cross hairs coincide exactly with the centers of the pupils and the scales are so arranged that the distance between the pupils may be read thereon and also the relative position of one pupil vertically with respect to the other, it being observed that in many persons, one eye is higher than the other.

These measurements indicate to the operator the exact distances between the centers of the lens of the glasses and also what allowance to make in the position of the lens on account of one eye or pupil being higher than the other. These measurements also show the distance of each pupil from the center of the nose, which measurement is desirable in making properly fitted glasses. Such measurements also permit the operator to determine the exact height or position of the bifocal segment of the bifocal leans for each individual eye. The shutters 154 and 155 may be operated by means of their handles to slide them over to cover the respective windows having the cross hairs therein, the object being further accuracy of measurement by permitting rays of light to enter the eye parallel.

The bars 130 and 131 may also be further adjusted to bring the pads or projections 158 and 159 against the sides of the nose and the lower scales 146 and 147 may be read to determine such distance.

While the operator may determine the width of the nose at any point it is particularly desirable to determine the width at the point at which guards or pads of the spectacle frame or mounting will rest.

The calibrations used in connection with the temples also serve to indicate the required angles at which the spectacle temples should be set in order to give proper angle of the lenses before the eyes.

From this description it will be seen that substantially all necessary or desirable measurements of a face may be made for the purpose of accurately determining the shape, size, and other characteristics of lenses and frames adapted to properly fit such face and the glasses or spectacles may be made to conform to such measurements and when so constructed will properly fit the patient.

It will also be noted that the apparatus may be used for any purposes desired and changes may be made in the arrangement of the parts and details of construction without departing from the scope of our invention as set forth in the following claims in which we claim.

1. In a measuring device, the combination of a frame, vertically adjustable blocks mounted in said frame, screws for adjusting said blocks, scales for indicating the positions of said blocks, transversely arranged bars slidably mounted in said blocks, rack and gear devices for actuating the bars, scales for indicating the positions of the bars, transparent panes carried by said bars, and cross marks on said panes.

2. In a facial measuring apparatus, the combination of a support, an adjustable chin rest carried by said support, a frame adjustably mounted in said support, means for adjusting said frame and holding it in adjusted position, said frame having a transverse base member with a scale thereon, a block slidably mounted in said member and having a point to coact with the scale, a calibrated post carried by said block, a sleeve slidably mounted on said post, a pin transversely mounted in the sleeve, and a scale on the pin for making horizontal measurements.

3. In a measuring device, the combination of a relatively fixed head rest, a frame adjustably mounted adjacent to the rest, a post slidably mounted in the base of the frame, a horizontal scale on the frame adapted to coact with the post for making horizontal measurements, a sleeve slidably mounted on the post, a scale on the post coacting with the sleeve for making vertical measurements, a horizontal pin slidably mounted in the sleeve, and a scale on the pin for making horizontal measurements at an angle to the first named horizontal measurements.

4. A measuring apparatus having a chin rest, a frame having side portions arranged adjacent to the rest and having vertical guideways in the side portions thereof, horizontal rods slidably mounted in said guideways adjacent to the lower portion thereof, the opposed ends of said rods being adapted to be brought into contact with the sides of the face of a person, scales coacting with the rods for measuring the width of the face, scales coacting with the rods for measuring the vertical positions thereof, a second pair of rods slidably mounted in said guideways adjacent to the top of the frame and adapted for measuring the width of the upper portion of the head, scales for measuring the distance between the inner ends of said rods, and scales for determining the vertical positions of said rods.

5. In a facial measuring apparatus, the combination of a support, a chin rest carried by said support, a frame adjustably mounted on the support and having vertical guideways at the sides thereof, blocks slidably mounted in said guideways, means for measuring the positions of the blocks with respect to the chin rest, carriers slidably mounted in said blocks, temple pieces slidably mounted in the carriers, racks on said temple pieces, gears coacting with the racks, rods mounted in the carriers for actuating said gears, means for turning the rods and scales for indicating the positions of the temples.

6. A device as per claim 5 having plates rotatably mounted on the carriers, said plates having pointers for use in determining the positions of the pupils and scales coacting with said pointers.

7. In a device of the character set forth, the combination of a frame having vertical side members with guideways therein, slides mounted in said guideways, bearings on said slides, tubes slidably mounted in the bearing, guides secured to the opposed ends of said tubes, bows slidably mounted in said guides and adapted to engage with the ears of a patient, racks on said bows, rods mounted in said tubes, gears on said rods engaging with said racks, knobs for turning said rods, pointers on said knobs, and calibrated discs on the tubes, the arrangement being such that the calibrations will indicate the proper lengths of the adjusted bows.

8. In an apparatus for fitting glasses, the combination of a support, a sub-frame adjustably mounted on the support, a chin rest adjustably mounted on the sub-frame, a bracket engaging with said sub-frame, means for adjusting said bracket, a main frame adjustably mounted on the bracket, means for adjusting the main frame, and a plurality of measuring devices for measuring different parts of the face when supported on the chin rest and for allocating the pupils of the eyes with respect to other portions of the head.

9. An optical measuring apparatus comprising a base, a rigid chin support carried by said base, lateral adjustable supports carried by said base and coacting with the chin support for holding the head of a person with the sagittal plane passing through the center of the apparatus, measuring devices operatively associated with the base and having one scale means for measuring the distance of each pupil from the sagittal plane, and another scale means for measuring the relative positions of the pupils in a vertical plane.

10. An optical instrument for use in fitting glasses, including holding means for rigidly supporting the head of a person with the face framed in the instrument whereby the inter-parietal plane of the person's head will pass vertically through approximately the center of the instrument, means carried by and coacting with said holding means for accurately measuring the distance between the pupils of the person's eyes and for determining the relative position of one eye vertically with respect to the other.

11. An apparatus for making pupilary measurements for use in constructing eye glasses, comprising means for holding the head in a substantially rigid position, measuring devices adjustably supported on said means having centers adapted to be positioned in front of the pupils of the respective eyes of the person whose measurements are to be taken, means for adjusting said devices simultaneously toward or away from the eyes, means for adjusting said devices independently of each other in a horizontal direction to measure the pupilary distance and means for adjusting said devices independently of each other in a vertical direction to measure the vertical position of one eye with respect to the other.

12. An apparatus for making pupilary measurements of the eyes of a person including supporting means for holding the head rigidly by engagement under the chin and laterally at the temples, and pupilary measuring devices adjustably supported on said means and separately movable from each side of the head and scales for indicating the respective positions of said measuring devices in both vertical and horizontal directions.

13. In an apparatus for making pupilary measurements for the purposes described, the combination of a support, a chin rest carried by said support, a frame slidably mounted on the support, means for adjusting the frame horizontally, adjustable supports carried by the frame and adapted to engage with the temples adjacent to the eyes for holding the head in substantially rigid position, independently operable pupil measuring devices mounted in said frame and having centers adapted to be positioned in alignment with the centers of the pupils, means for adjusting each of said devices in horizontal and vertical directions to bring the centers in front of the pupils, and indicating means associated with said devices for indicating the distance apart of the pupils and also the position of one pupil vertically with respect to the other.

STEPHEN H. BOLL.
JULIAN E. LEWIS.